O. W. Stow.
Bending Tinned Plates.
No. 3,738. Reissued Nov. 16, 1869.
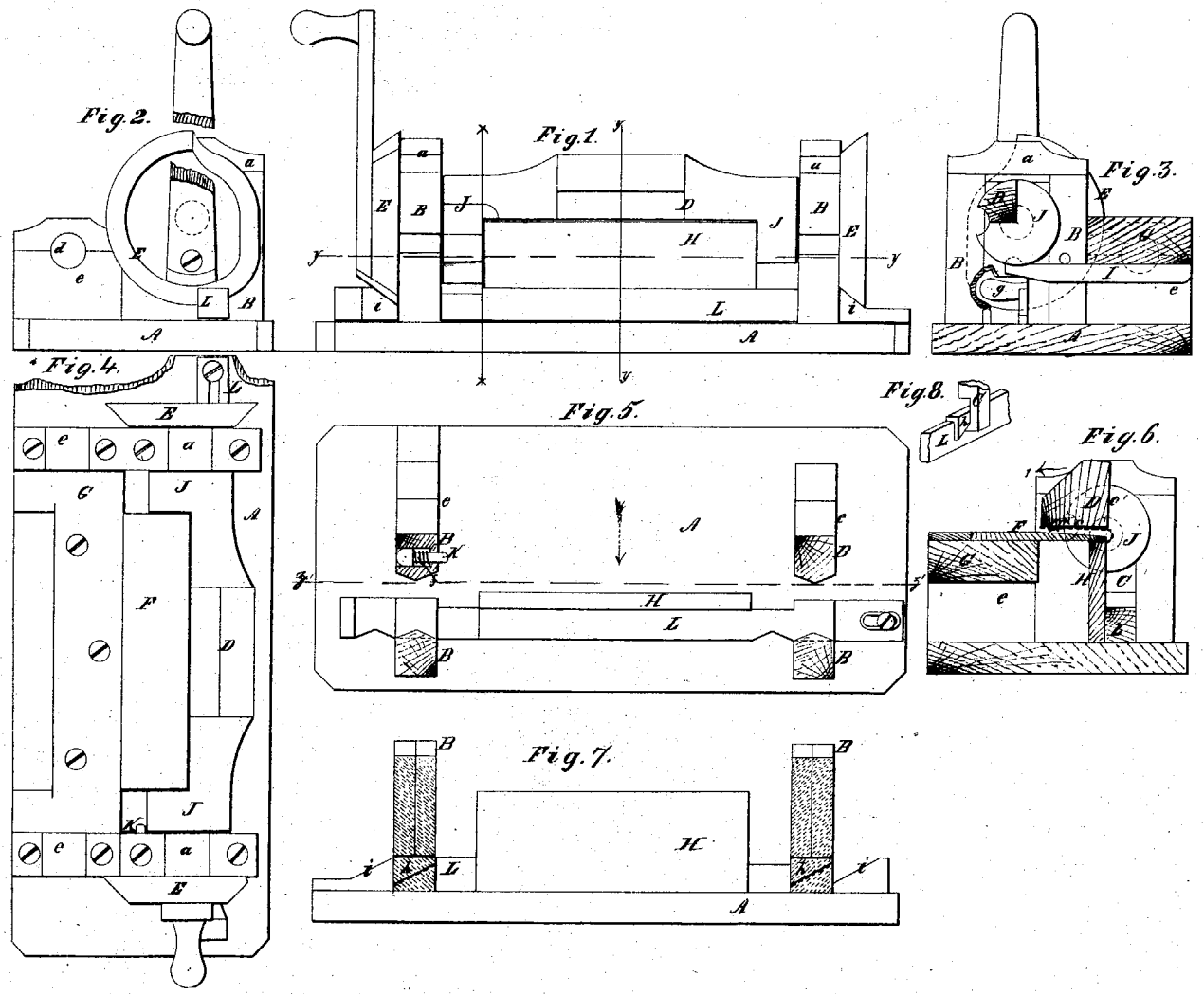
Witnesses:
F. A. Jackson
McDean Overall
Inventor:
O. W. Stow
Per Munn & Co
Attorneys
N. PETERS, PHOTO-LITHOGRAPHER, WASHINGTON, D. C.

UNITED STATES PATENT OFFICE.

O. W. STOW, OF PLANTSVILLE, CONNECTICUT.

IMPROVEMENT IN MACHINES FOR FOLDING TINNED PLATES.

Specification forming part of Letters Patent No. 72,561, dated December 24, 1867; Reissue No. 3,738, dated November 16, 1869.

*To all whom it may concern:*

Be it known that I, O. W. STOW, of Plantsville, in the county of Hartford and State of Connecticut, have invented a new and Improved Machine for Folding Sheet-Metal Plates; and I do hereby declare that the following is a full, clear, and exact description thereof, reference being had to the accompanying drawings, making a part of this specification, in which—

Figure 1 is a front view of my invention; Fig. 2, an end or side view of the same. Fig. 3 is a transverse vertical section of the same taken in the line *x x*, Fig. 1; Fig. 4, a plan or top view of the same; Fig. 5, a horizontal section of the same taken in the line *y y*, Fig. 1; Fig. 6, a transverse vertical section of the same taken in line *z z*, Fig. 1; Fig. 7, a vertical longitudinal section of the same taken in line *z′ z′*, Fig. 5; and Fig. 8, a detached perspective view of a portion of the same.

Similar letters of reference indicate like parts.

This invention relates to that class of machines for folding sheet metal in which the distance between the adjacent edges of the folding-bar and the folding-plate can be increased or diminished at pleasure for the purpose of forming open or close locks or bends in sheet metal, as shown in the patents granted to myself February 28, 1860, and reissued August 4, 1868; and it consists in the use or employment of adjustable bearings for the journals of the folding-bar in combination with a gripping mechanism which grips the metal simultaneously with and during the operation of said folding-bar upon the metal.

A represents a base-plate having upright bars B attached, two near each end, and connected at their top ends by cross-plates *a*. These upright bars B serve as guides for bearings C, which are allowed to work freely up and down between them, and in these bearings the journals *b* (indicated by broken circles in Figs. 2 and 3) of a folding-bar, D, are fitted and work. This folding-bar is constructed with two plane surfaces or sides, *c c′*, which are at right angles with each other, as shown clearly in Fig. 6, and on each journal *b* of the folding-bar, at the outer sides of the bearings C, there is secured a cam, E. (Shown in Figs. 1, 2, and 4.)

F represents a folding-plate, the same being attached to a bar, G, provided with a journal, *d*, at each end fitted in fixed bearings *e* on the base-plate A. This admits of a certain degree of vertical play of the folding-plate F, the same being allowed to rise and fall to a certain extent to admit of the tin or metal plate G× to be bent or folded being inserted between the folding-plate F and a fixed bearing-surface, H, as shown in Fig. 6. The folding-plate F has an arm, I, attached to it at one or both ends, said arm or arms extending forward underneath the folding-bar D near its ends, on which the cams J are formed. One cam, J, and one arm, I, are only shown in the drawings.

Through the rear upright bar, B, adjoining the arm I, a horizontal sliding pin, K, is fitted and allowed to work freely. This pin has a spiral spring, *f*, upon it, which has a tendency to keep the pin sufficiently far within the bar B, in which it is fitted, so that it will not interfere with the movement of the arm I′, and the cam E, adjoining the pin K, has a groove, *g*, made in it to allow the spring *f* to keep the pin K free from the arm I. (See Fig. 3.) L designates a slide placed longitudinally on the base-plate A, and provided at its rear side with two inclined surfaces, *h h*, (shown more particularly in Fig. 7,) and the bearings C C extend down and catch or hook under these inclined surfaces, as shown in Fig. 8, so that by moving the slide L longitudinally the bearings C C, and consequently the folding-bar D, admit of being raised under the action of the cams E, the latter bearing upon inclined surfaces *i i* on the upper surfaces of the slide L.

The operation is as follows: In case it is desired to fold a piece of sheet-metal plate with a close or tight fold, the slide L is adjusted to the left, as shown in Figs. 1, 5, and 7, which causes the bearings C to be brought down to their fullest extent between the bars B B, and by turning the folding-bar D so that its plane surface or side *c* will be down in a horizontal plane in front of the folding-plate F the metal plate may be inserted between the folding-plate F and the fixed bearing H, and over the surface or side *c* of the folding-bar, and by turning the bar D over in direction indicated by arrow 1 in Fig. 6 the sheet of metal will be bent or folded with a close joint; but by moving the slide L to the right, so that the inclined surfaces *h* may be free from the lower hooked ends of the bearings C, the cams E will as the bar D is turned raise the bar D and cause the metal plate to be folded with an open joint, so that it may receive a wire. This open joint is shown in Fig. 6.

In turning the bar D to form a joint in the plate G× it is necessary, after the end of the plate has been inserted between the folding plate F and the bearing-surface H, to have the front edge of the folding-plate F press upon the plate G× to hold it firm; and this is effected by the cam or cams J, which act upon the arms or arm I, and force down the front edge or end of the folding-plate F, and previous to said cam or cams leaving the arm or arms I the pin K is forced out from the upright bar B by the cam E adjoining it over the arm I, and the folding-plate F is thus kept down by said pin, so as to grip the metal during the whole operation of the folding-bar D. The folding-bar as it rises in its bearings when turning an open lock also raises the cam or cams J with it. Therefore the cam or cams J alone cannot be depended upon to keep the folding-plate F down so as to grip the plate G×. It is necessary to the successful operation of the machine that the plate G× should be firmly held in place during the whole operation of the folding-bar D. I therefore arrange the pin K so as to lock the gripping mechanism, and firmly hold the plate independent of the position in which the bearings C C may be adjusted.

I claim as my invention—

In a machine substantially as herein described, the combination of the folding-plate F, folding-bar D, and adjustable bearings, the whole combined and arranged substantially as described, whereby the distance between the adjacent edges of the folding-plate and folding-bar can be increased or diminished by means of the adjustable bearings for the journals of the folding-bar.

O. W. STOW.

Witnesses:

STEPHEN WALKLEY,
E. R. NEWELL.